(12) United States Patent
Karin et al.

(10) Patent No.: US 11,487,880 B2
(45) Date of Patent: Nov. 1, 2022

(54) INFERRING SECURITY INCIDENTS FROM OBSERVATIONAL DATA

(71) Applicant: Microsoft Technology Licensing, LLC, Redmond, WA (US)

(72) Inventors: Omer Karin, Tel Aviv (IL); Yotam Livny, Gadera (IL); Yaniv Zohar, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 378 days.

(21) Appl. No.: 16/570,970

(22) Filed: Sep. 13, 2019

(65) Prior Publication Data
US 2021/0081539 A1    Mar. 18, 2021

(51) Int. Cl.
H04L 29/06    (2006.01)
G06F 21/57    (2013.01)
G06F 11/30    (2006.01)
G06F 21/55    (2013.01)

(52) U.S. Cl.
CPC ........ G06F 21/577 (2013.01); G06F 11/3065 (2013.01); G06F 21/552 (2013.01); G06F 2201/86 (2013.01)

(58) Field of Classification Search
CPC .. G06F 21/577; G06F 21/552; G06F 11/3065; G06F 2201/86
USPC .......................................................... 726/26
See application file for complete search history.

(56) References Cited

U.S. PATENT DOCUMENTS

| 2015/0074806 | A1  | 3/2015  | Shou et al. |
| 2016/0080335 | A1* | 3/2016  | Elzur ................... H04L 63/164 |
|              |     |         | 713/171 |
| 2017/0230392 | A1* | 8/2017  | Dean .................. H04L 63/1425 |
| 2018/0351783 | A1  | 12/2018 | Patrich et al. |
| 2019/0141058 | A1* | 5/2019  | Hassanzadeh ...... H04L 63/0227 |
| 2020/0057850 | A1* | 2/2020  | Kraus ....................... G06N 3/08 |

OTHER PUBLICATIONS

Spirtes, et al., "Causation, Prediction, and Search", In Publication of MIT Press, 2000, 566 Pages.
Derek, Lin, "Using Data Science Techniques for the Automatic Clustering of IT Alerts", Retrieved from: https://tanzu.vmware.com/content/blog/using-data-science-techniques-for-the-automatic-clustering-of-it-alerts, Jun. 5, 2014, 4 Pages.
"International Search Report and Written Opinion Issued in PCT Application No. PCT/US20/038294", dated Aug. 5, 2020, 12 Pages.

* cited by examiner

*Primary Examiner* — Evans Desrosiers
(74) *Attorney, Agent, or Firm* — Fiala & Weaver P.L.L.C.

(57) ABSTRACT

Methods, systems, and apparatuses are provided for inferring security incidents from observational data. For example, alerts generated with respect to a set of entities by a first alert generator are received, association scores are calculated for pairs of alerts, the alerts are formed into clusters based on the association scores, and a security incident model is formed based on the clusters. The security incident model may define sequences of alerts corresponding to security incidents. Furthermore, the security incident model may be used to determine a match between additional alerts and a sequence of alerts in the security incident model and identify the additional alerts as a security incident corresponding to the sequence of alerts in the security incident model.

20 Claims, 6 Drawing Sheets

500

600

700

INFERRING SECURITY INCIDENTS FROM OBSERVATIONAL DATA

BACKGROUND

Cloud computing is a form of network-accessible computing that provides shared computer processing resources and data to computers and other devices on demand over the Internet. Cloud computing enables the on-demand access to a shared pool of configurable, network-accessible computing resources, such as computer networks, servers, storage, applications, and services (collectively, in any combination, "the cloud"). Given the vast resources available on "the cloud", cloud workload security has become increasingly important.

To combat security issues, cloud security providers offer services with threat detection capabilities to alert customers to malicious activity targeting their environments. As in conventional computer systems, cloud computing systems may generate several alerts related to a single attack campaign. Many attacks follow a common sequence of steps to achieve some nefarious objective. Such attacks are often referred to as a "kill-chain."

To render a collection of alerts meaningful to a system administrator, a cloud security provider may aggregate alerts that align with a kill-chain pattern, or other known pattern, into an "incident" to provide a consolidated view of the attack campaign. Typically, an incident includes a sequence of alerts, where each alert corresponds to a particular step in the attack pattern. These alerts contain valuable information helpful in determining what triggered the alert, the resources targeted, and the source of the attack.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementations disclosed herein are directed to inferring security incidents from a group of received alerts. For example, alerts generated with respect to a set of entities by a first alert generator are received, association scores are calculated for pairs of alerts, the alerts are formed into clusters based on the association scores, and a security incident model is formed based on the clusters. The security incident model may define sequences of alerts corresponding to security incidents. Furthermore, the security incident model can be used to determine a match between additional alerts and a sequence of alerts in the security incident model and identify the additional alerts as a security incident corresponding to the sequence of alerts in the security incident model.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
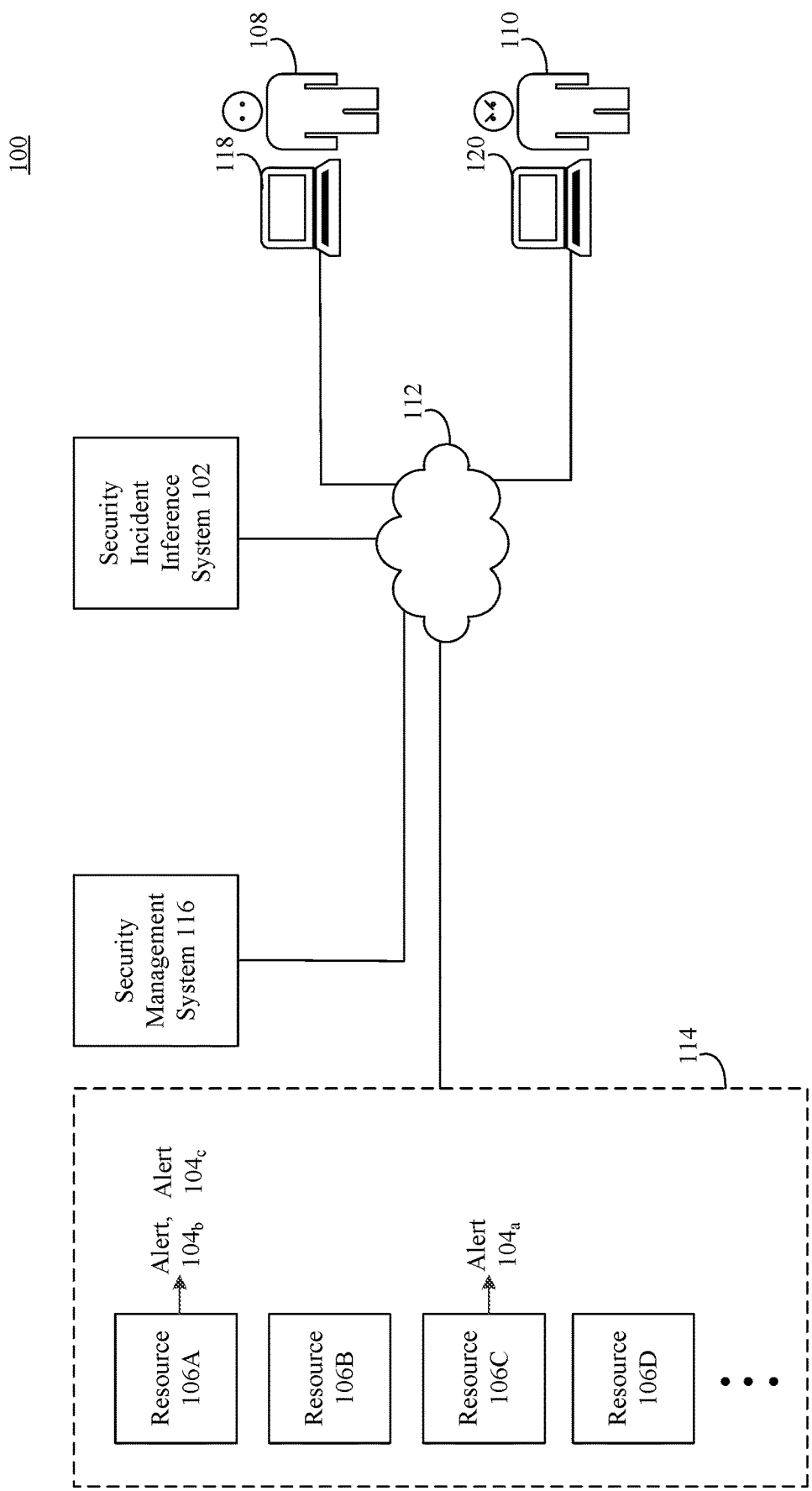
FIG. 1 shows a block diagram of an example security incident determination system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Cloud computing is a form of network-accessible computing that provides shared computer processing resources and data to computers and other devices on demand over the Internet. Cloud computing enables the on-demand access to a shared pool of configurable, network-accessible computing resources, such as computer networks, servers, storage, applications, and services (collectively, in any combination, "the cloud"). Given the vast resources available on "the cloud", cloud workload security has become increasingly important.

To combat security issues, cloud security providers offer services with threat detection capabilities to alert customers to malicious activity targeting their environments. As in conventional computer systems, cloud computing systems may generate several alerts related to a single attack campaign. Many attacks follow a common sequence of steps to achieve some nefarious objective. Such attacks are often referred to as a "kill-chain."

To render a collection of alerts meaningful to a system administrator, a cloud security provider aggregates any alerts that align with a kill-chain pattern into an "incident" to provide a consolidated view of the attack campaign. Typically, an incident includes a sequence of alerts, where each alert corresponds to a particular step in the attack pattern. These alerts contain valuable information helpful in determining what triggered the alert, the resources targeted, and the source of the attack.

However, in some instances, a malicious event in an attack series may not be detected and thereby an alert corresponding to the malicious event may not be triggered. If an alert is not reported for a sequence of issued alerts, then the appropriate incident associated with the attack series may not be designated and provided to a system administrator. For example, an attacker may move laterally from a compromised resource to another resource within a same network to harvest valuable data. If the lateral move to the other resource is not detected, then an alert indicating that the other resource is comprised will not be included in the reported incident and a system administrator will be unaware of the comprised resource and unable to remediate the attack. Current threat detection techniques are not necessarily foolproof and can at times miss malicious activity targeting resources.

Moreover, because of the dynamic nature of attackers and of systems targeted by attackers, it is not necessarily obvious how an attack campaign is represented as a security incident to a system administrator. Conventionally, associations between alerts may be discovered using data mining association rules (e.g., Apriori algorithm). However, this methodology may identify spurious associations between pairs of alerts. For example, two alerts might be indicated as associated with each other because the events that triggered the alerts occurred on the same type of resource (e.g., web servers). The events may not be associated with the same attack campaign and the fact that the events occurred on the same type of resource may be merely coincidental. Thus, current threat detection techniques may group alerts into security incidents that may not accurately represent an attack campaign.

Embodiments disclosed herein address these issues described above. Embodiments disclosed herein are directed to inferring security incidents from observational data. For example, in embodiments, alerts generated with respect to a set of entities by a first alert generator are received, association scores are calculated for pairs of alerts, the alerts are formed into clusters based on the association scores, and a security incident model is formed based on the clusters. The security incident model may define sequences of alerts corresponding to security incidents. Furthermore, in embodiments, the security incident model can be used to determine a match between additional alerts and a sequence of alerts in the security incident model and identify the additional alerts as a security incident corresponding to the sequence of alerts in the security incident model.

Such embodiments, and further embodiments, may be implemented in various ways. For instance, FIG. 1 shows a block diagram of an example security incident determination system 100, according to an embodiment. As shown in FIG. 1, system 100 is implemented with respect to an environment 114 that includes any number of resources (e.g., resources 106A, 106B, 106C, 106D) that a user 108 is authorized to access and an attacker 110 is not authorized to access, a security management system 116, and a security incident inference system 102. System 100 is described in further detail as follows.

As shown in FIG. 1, resources 106A-106D, security management system 116, and security incident inference system 102 are communicatively coupled via a network 112. Resources 106A-106D are also communicatively coupled with each other via network 112. Network 112 may comprise one or more networks such as local area networks (LANs), wide area networks (WANs), enterprise networks, the Internet, etc., and may include one or more of wired and/or wireless portions.

For illustration purposes, environment 114 is shown to include resources 106A, 106B, 106C, and 106D, but may include any number of resources, including tens, hundreds, thousands, millions, and even greater numbers of resources. Environment 114 may be comprised of resources (e.g., servers) running on different clouds and/or in on-premises data centers of an enterprise or organization associated with a user 108. Resources 106A, 106B, 106C, and 106D may include any cloud computing resources, including computer networks, servers, storage, applications, and/or services, and/or may include further types of resources. For example, in an embodiment, resources 106A, 106B, 106C, and 106D may each be a server and form a network-accessible server set that are each accessible by a network such as the Internet (e.g., in a "cloud-based" embodiment) to store, manage, and process data. Additionally, in an embodiment, environment 114 may include any type and number of other resources including resources that facilitate communications with and between the servers (e.g., network switches, networks, etc.), storage by the servers (e.g., storage devices, etc.), resources that manage other resources (e.g., hypervisors that manage virtual machines to present a virtual operating platform for tenants of a multi-tenant cloud, etc.), and/or further types of resources.

In an embodiment, resources 106A, 106B, 106C, and 106D may be configured to execute one or more services (including microservices), applications, and/or supporting services. A "supporting service" is a cloud computing service/application configured to manage a set of servers to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Resources 106A, 106B, 106C, and 106D may be configured to execute any number of supporting services, including multiple instances of the same and/or different supporting services.

User 108 and any number of further users (e.g., individual users, family users, enterprise users, governmental users, etc.) may access resources 106A, 106B, 106C, and 106D and any other resources of environment 114 through network 112 via computing devices, including a computing device 118 accessed by user 108. These computing devices used to access resources of environment 114 may be any type of a stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 118 of user 108 may interface with resources 106A, 106B, 106C, and 106D through application programming interfaces (APIs) and/or by other mechanisms. Note that any number of program interfaces may be present.

Though security management system 116 and security incident inference system 102 are shown separate from resources 106A, 106B, 106C, and 106D, in an embodiment, security management system 116 and security incident inference system 102 may be incorporated in one or more resources of environment 114. Security management system 116 and security incident inference system 102 may also be incorporated in any type of stationary or mobile computing device(s) described elsewhere herein or otherwise known. For instance, security management system 116 and security incident inference system 102 may be incorporated in a network/cloud supporting service mentioned elsewhere herein or otherwise known.

Security management system 116 may be configured to manage and/or monitor the security of resources 106A-106D and any other resources in environment 114. For example, attacker 110 may attempt to access resources 106A, 106B, 106C, and 106D via network 112 for an unauthorized purpose using any type of stationary or mobile computing device, which may be similar to computing devices used by user 108, such as a computing device 120. In some instances, attacker 110 may try to install and execute malicious software (e.g., malware) on a resource, attempt a brute-force attack (e.g., password guessing) on a resource, persist in a compromised network to access valuable data and/or use a compromised resource to mount attacks against other resources in an environment.

If such attacks by attacker 110 occur, a resource of resources 106A, 106B, 106C, and 106D that is a target of an attack may generate an alert indicating that a perceived threat has been detected. For instance, as shown in FIG. 1, resources 106A and 106C generate alerts 104a, 104b, and 104c. These alerts may be generated following unauthorized or illegitimate attempts perpetrated by attacker 110 to access resources 106A and 106C. After being generated, in an embodiment, alert 104a may be stored in a log file maintained by resource 106C and alerts 104b and 104c may be stored in a log file maintained by resource 106A. A monitoring agent associated with security management system 116 may be installed on each of resources 106A, 106B, 106C, and 106D and configured to collect events (such as alerts 104a, 104b, and 104c) from log files, performance data, and other telemetry from the resources and send the collected information to security management system 116 via network 112.

Alerts 104a, 104b, and 104c may comprise any type of security alert, including but not limited to a potential virus alert, web application firewall alert, endpoint data protection alert, memory or other device access violations, etc. Similarly, alerts 104a, 104b, and 104c are not limited to security alerts generated in cloud computing systems described herein as exemplary embodiments. Alert evaluating system 108 may also operate on one or more standalone devices connected to a network in which security alerts are generated.

Alerts 104a, 104b, and 104c may have any suitable format, including an electronic file, one or more data packets, etc., and may include contextual information, such as a username, process name, IP address, etc., associated with a resource and/or application that the alert was generated based upon. Alerts 104a, 104b, and 104c may also include contextual information regarding any relationship the alert may have to another one or more alerts, such as temporal connections. Alerts 104a, 104b, and 104c may be individual alerts, groups of alerts, logs of alerts, or chains of alerts that may together resemble a potential threat.

Security management system 116 is further configured to correlate and analyze the collected information described above to enable real-time reporting and alerting on incidents that may require intervention. For example, security management system 116 may receive, via network 112, alert 104a from resource 106C and alerts 104b and 104c from resource 106A that warn of threats posed to the resources. Security management system 116 may further analyze alerts 104a, 104b, and 104c and generate a security incident based on the analysis of the alerts. More specifically, security management system 116 may correlate information associated with alerts 104a, 104b, and 104c and deduce that the alerts are part of the same security incident, which comprises a sequence of alerts of [104a, 104b, 104c], based on temporal relationships and/or contextual information (e.g., a username, process name, IP address, etc.) associated with each alert.

Additionally, security management system 116 may analyze a history of alerts existing on a cloud service, such as alert logs generated by individual computing devices and/or servers connected to a cloud or environment 114 or through logs aggregating a history of alerts across multiple computing devices and/or servers connected to the cloud or environment 114. The historical alerts may then be grouped together to form incidents based on a preexisting relationship, such as a timing relationship and/or whether the alert occurred on the same or similar resources. As described previously, these relationships between alerts may be discovered using data mining association rules, which may identify spurious associations between alerts and cause a security incident to be indicated that does not accurately represent an attack campaign. Moreover, in some instances, a malicious event in an attack series may not be detected and thereby an alert corresponding to the malicious event may not be triggered. If an alert is missing from a sequence of issued alerts, then the appropriate incident associated with the attack series may not be designated and provided to a system administrator.

Security incident inference system 102 is configured to form a security incident model that defines sequences of alerts corresponding to security incidents. The security incident model is formed based on valid associations between alerts that are generated with respect to a set of entities and prevents missing alerts not generated because a malicious event was not detected from causing an incomplete or invalid security incident being identified. When used herein, "entity" refers to a characteristic shared between a group of alerts. For example, alerts may be aggregated by entity based on alerts' association with a subscription, a resource, a user, an attacker, an organization or enterprise, and/or IP address.

In an embodiment, security incident inference system 102 may receive alerts identified by security management system 116 as a security incident via network 112. In one embodiment, for example, security incident inference system 102 may receive a set of alerts, including an alert sequence, generated with respect to a set of entities (e.g., any alerts generated in environment 114) from security management system 116 and form a security incident model based on the received alerts. Alternatively, or in addition to, security incident inference system 102 may receive one or more alerts directly from resources 106A, 106B, 106C, and 106D via network 112.

Once the security incident model is generated, security incident inference system 102 is further configured to determine a match between the alerts in the security incident model and identify the alerts as a security incident that corresponds to the sequence of alerts defined in the security incident model. To help illustrate, security incident inference system 102 may determine alert sequence [104*a*, 104*b*, 104*c*] corresponds to a security incident including alert sequence of [104*a*, 104*b*, 104*m*, 104*c*]. The indicated security incident includes alert 104*m* which is not included in the received alert sequence. As previously described, a security incident may include a sequence of alerts, where each alert corresponds to a step in an attack campaign. Say for illustration purposes, a malicious event committed by attacker 110 corresponding to alert 104*m* was not detected, resulting in alert 104*m* not to be generated. The notification indicating that the alert sequence corresponds to the security incident including the alert sequence of [104*a*, 104*b*, 104*m*, 104*c*] could be provided to user 108—informing the user of the previously unnoticed malicious event corresponding to alert 104*m* and allowing user 108 to investigate the attack and remediate any harm caused by the malicious event.

To provide real-world context, say attacker 110 first tries to unsuccessfully access resource 106C by submitting several possible passwords for an account associated with user 108, and resource 106C then generates alert 104*a* indicating that a brute force attempt was found. Next, attacker 110 successfully accesses resource 106A by submitting a correct password for an account associated with user 108, and resource 106A generates alert 104*b* indicating that a successful brute force attack was found. Attacker 110 then executes malicious code on resource 106A without detection by masquerading the malicious code as a benign process. If the event had been detected, alert 104*m* would have been generated by resource 106A indicating that a malicious process was created. Finally, attacker 110 uses resource 106A to try again to access resource 106C by submitting several possible passwords for an account associated with user 108 and resource 106A then generates alert 104*c* indicating an outgoing brute force attempt was found. Because alert 104*m* was not generated, user 108 is unaware that the malicious code is executing on resource 106A. This scenario, however, is preventable.

Embodiments described herein can provide users and/or system administrators with information associated with missing alerts that may be critical to an investigation of an attack campaign and that can help identify vulnerabilities in a threat detection solution offered by a cloud provider. Embodiments described herein also act as a second line of defense for resources of the environment, as threat detection systems are not necessarily foolproof and can at times miss malicious activity targeting resources. In addition, embodiments described herein avoid using spurious associations between alerts when inferring security incidents so that a security incident unrelated to an attack will not be indicated to a user and/or system administrator.

Figure 2:
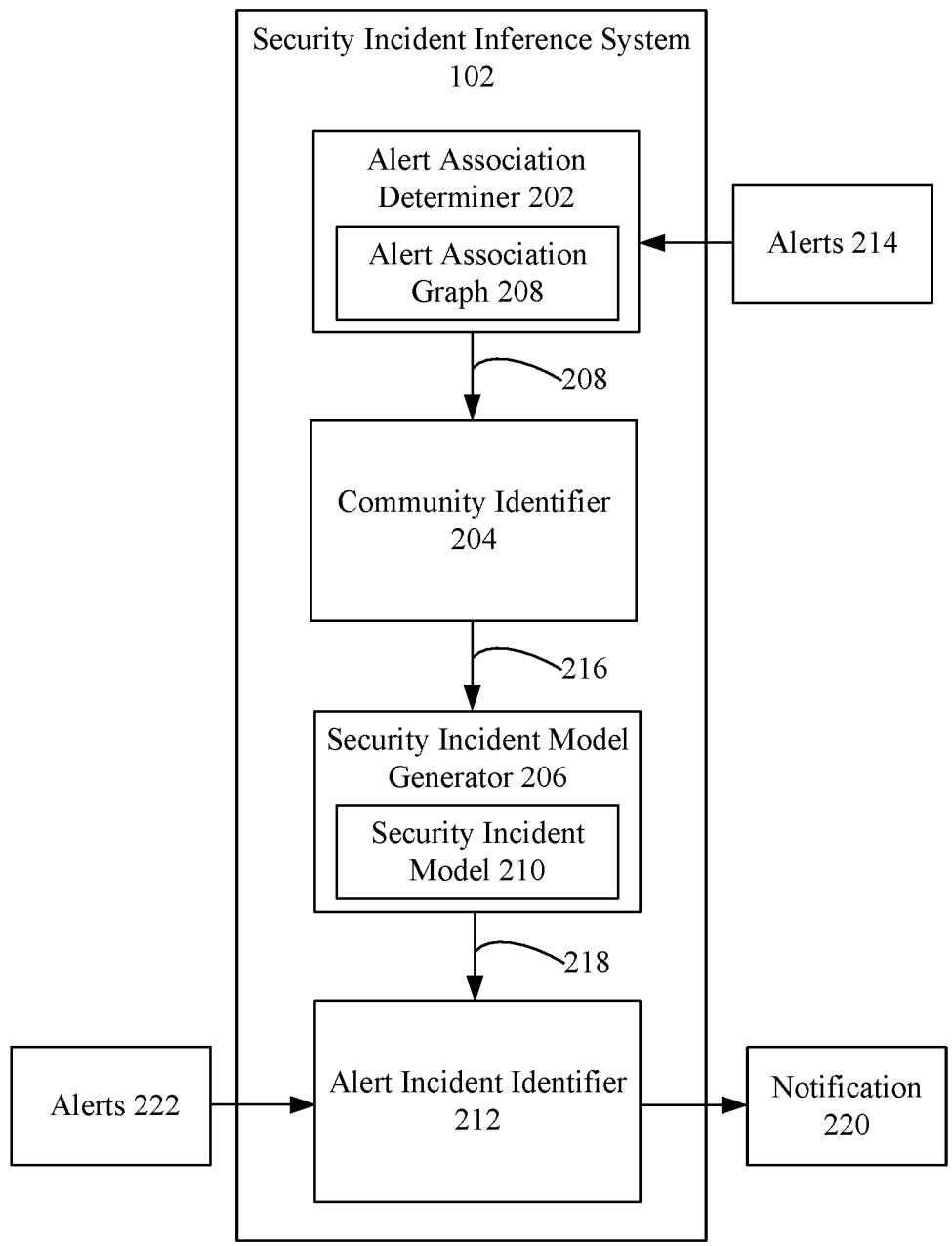
FIG. 2 shows a block diagram for a security incident inference system that forms a security incident model based on received alerts generated with respect to a set of entities and identifies additional alerts as a security incident using the security incident model, according to an example embodiment.

The process described with reference to FIG. 1 is described as follows in more detail with reference to FIG. 2. Note that security incident inference system 102 of FIG. 1 may be implemented in various ways to perform its functions. For instance, FIG. 2 is a block diagram for a system 200 that forms a security incident model based on received alerts generated with respect to a set of entities and identifies additional alerts as a security incident using the security incident model, according to an example embodiment.

System 200 includes an example embodiment of security incident inference system 102. As shown in FIG. 2, security incident inference system 102 includes an alert association determiner 202, a community identifier 204, a security incident model generator 206, and an alert incident identifier 212. System 200 is described in further detail as follows.

Alert association determiner 202 is configured to determine how strongly associated pairs of alerts are that were generated with respect to a set of entities. For example, as depicted in FIG. 2, alert association determiner 202 receives alerts 214 (e.g., the alert sequence of [104*a*, 104*b*, 104*c*] from security management system 116 or alerts 104*b* and 104*c* from resource 106A and alert 104*a* from resource 106A in FIG. 1) and calculates association scores for pairs of alerts of alerts 214, where the association scores indicate a strength of association between pairs of alerts. In an embodiment, alerts 214 may be generated with respect to a set of entities. To help illustrate, with reference to FIG. 1, alerts 104*a*, 104*b*, and 104*c* are generated with respect to some of the following entities: being generated in relation to events detected on resources in environment 114, being generated in relation to events detected on resources accessible to user 108, and being generated in relation to events related to an attack campaign perpetrated by attacker 110.

In an embodiment, alert association determiner 202 may be configured to generate an alert association graph 208 based on the calculated association scores. Alert association determiner 202 may store security alert association graph 208 in a storage (not pictured in FIG. 2) that may include one or more of any type of suitable storage medium, such as a hard disk, solid-state drive, magnetic disk, optical disk, read-only memory (ROM), or random-access memory (RAM). Alternatively, alert association graph 208 may be stored remotely from alert association determiner 202. Alert association graph 208 may be stored in storage in any form, such as in the form of a table, array, or otherwise. Additional detail for generating alert association graph 208 is described with reference to FIG. 4 further below.

Community identifier 204 is configured to cluster alerts that were generated with respect to a set of entities. For example, as shown in FIG. 2, community identifier 204 receives alert association graph 208 from alert association determiner 202. Community identifier 204 may cluster alerts 214 based on alert association graph 208. Any suitable algorithm (e.g., the Louvain method, Bron-Kerbosch algorithm, the Jaccard index, etc.,) may be used to find one or more communities (interconnected sets of alerts in graph 208) within alerts 214. In another embodiment, community identifier 204 may receive association scores for pairs of alerts of alerts 214 from alert association determiner 202 and cluster alerts 214 based on the association scores.

Security incident model generator 206 is configured to form a security incident model that defines sequences of alerts corresponding to security incidents. For example, as shown in FIG. 2, security incident model generator 206 may receive a list of clusters 216 indicating the determined clusters of alerts 214 from community identifier 204 and generate a security incident model 210 based on list of clusters 216. Security incident model 210 may define sequences of alerts of alerts 214 that correspond to security incidents. In an embodiment, security incident model generator 206 may store security incident model 210 in storage (not pictured in FIG. 2) that may include one or more of any type of suitable storage medium, such as a hard disk, solid-state drive, magnetic disk, optical disk, read-only memory (ROM), or random-access memory (RAM). Alternatively, security incident model 210 may be stored remotely from security incident model generator 206. Security incident model 210 may have any suitable format, including being a file containing model definition information in any form, such as human-readable text, XML (extensible markup language), C# or other programming language, binary code, or any other form. Additional detail for generating security incident model 210 is described with reference to FIG. 5, further below.

Alert incident identifier 212 is configured to use security incident model 210 to identify if alerts received by alert incident identifier 212 as a security incident. For example, as shown in FIG. 2, alert incident identifier 212 receives alerts 222 (e.g., from security management system 116 and/or resources 106A, 106B, 106C, 106D in FIG. 1) and accesses security incident model 210 to identify if alerts 222 matches a sequence of alerts in security incident model 210. If a match is detected, alert incident identifier 212 may identify alerts 222 as a security incident and provide a notification 220 of the security incident to an alert generator (e.g., security management system 116 and/or resources 106A, 106B, 106C, 106D in FIG. 1) or system administrator. In one embodiment, the identified security incident may include alerts 222 and additional alerts not included in alerts 222 that are related to the identified security incident and all these alerts may be indicated in notification 220. In another embodiment, the identified security incident may include a portion of alerts 222 that are related to the identified security incident and only the portion of alerts 222 that are related to the identified security incident may be indicated in notification 220.

Figure 3:
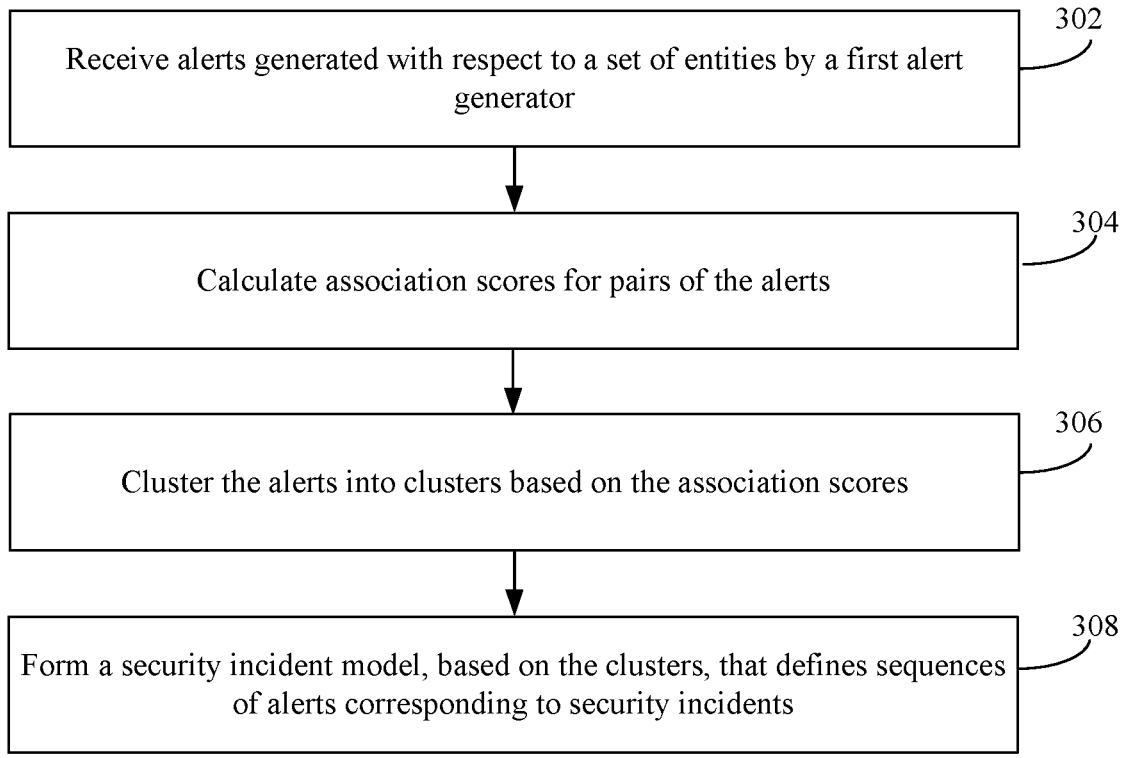
FIG. 3 shows a flowchart providing a process for forming a security incident model that defines sequences of alerts corresponding to security incidents, according to an example embodiment.

As described above, security incident inference system 102 of FIG. 1 and FIG. 2 may operate in various ways. For instance, FIG. 3 shows a flowchart 300 for forming a security incident model that defines sequences of alerts corresponding to security incidents, according to an example embodiment. In an embodiment, steps of flowchart 300 may be implemented by alert association determiner 202, community identifier 204, and security incident model generator 206 of FIG. 2. Other structural and operational embodiments will be apparent to persons skilled in the relevant art(s) based on the following discussion regarding flowchart 300.

Flowchart 300 begins with step 302. In step 302, alerts generated with respect to a set of entities by a first alert generator are received. For example, with reference to FIG. 2, alert association determiner 202 receives alerts 214. In an embodiment, as described herein with reference to FIG. 1 and continued reference to FIG. 2, alert association determiner 202 may receive a security incident (e.g., an alert sequence of [104a, 104b, 104c] in FIG. 1) from security management system 116 and/or may receive alerts (e.g., 104a, 104b, 104c in FIG. 1) directly from resources of environment 114. The received alerts may be generated with respect to a set of entities (e.g., generated with respect to: environment 114, user 108, attack 110, resources 106A, 106B, 106C, 106D etc.).

In step 304, association scores are calculated for pairs of the alerts. For example, with reference to FIG. 2, alert association determiner 202 calculates association scores for all pair combinations of alerts of alerts 214. In an embodiment, as described herein with reference to FIG. 1 and continued reference to FIG. 2, if alerts 214 included alerts 104a, 104b, and 104c, alert association determiner 202 may calculate association scores between pairs of alerts: 104a and 104b, 104a and 104c, 104b and 104c. The calculated associations scores would indicate strength of association between pairs of alerts: 104a and 104b, 104a and 104c, 104b and 104c.

In step 306, the alerts are clustered into clusters based on the association scores. For example, with reference to FIG. 2, community identifier 204 may receive association scores for pairs of alerts of alerts 214 from alert association determiner 202 and cluster alerts 214 based on the association scores. As described above different algorithms may be used to find communities of related alerts within alerts 214.

In step 308, a security incident model is formed based on the clusters, where the security incident model defines sequences of alerts corresponding to security incidents. For example, with reference to FIG. 2, alert incident identifier 212 may form security incident model 210, based on the clusters of alerts 214. In this example, security incident model 210 defines sequences of alerts 214 that correspond to security incidents. To help further illustrate, as shown in FIG. 2, security incident model generator 206 may receive a list of clusters 216, indicating the determined clusters of alerts 214, from community identifier 204 and generate security incident model 210 based on list of clusters 216.

Figure 4:
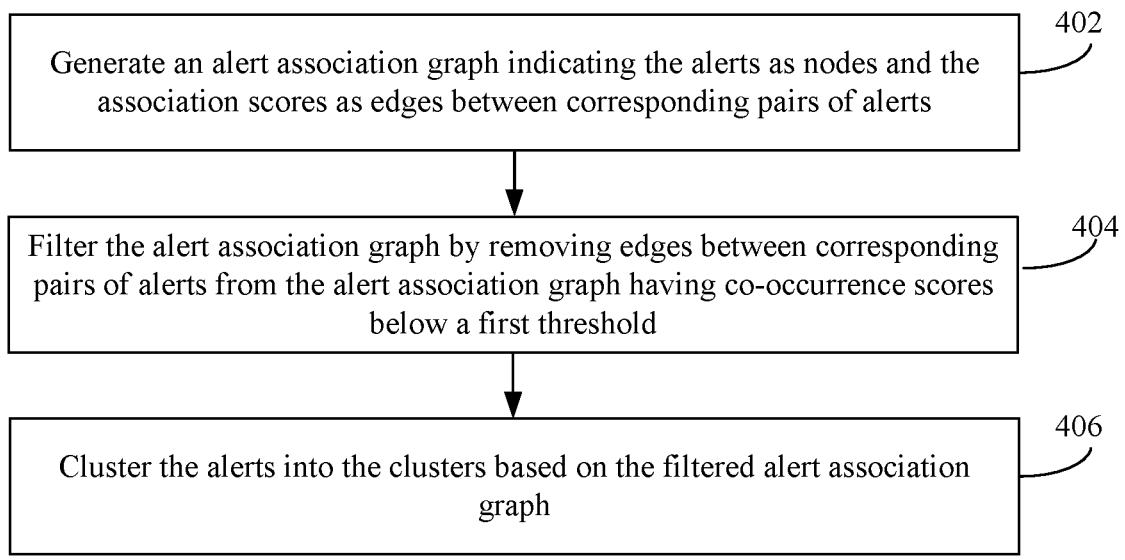
FIG. 4 shows a flowchart providing a process for generating an alert association graph and clustering alerts based on the alert association graph, according to an example embodiment.

As described previously, community identifier 204 may also cluster alerts 214 based on alert association graph 208. FIG. 4 is described as follows with regard to an association graph example. FIG. 4 shows a flowchart 400 for generating an alert association graph and clustering alerts based on the alert association graph, according to an example embodiment. In an embodiment, steps of flowchart 400 may be implemented by alert association determiner 202 and community identifier 204 of FIG. 2. Other structural and operational embodiments will be apparent to persons skilled in the relevant art(s) based on the following discussion regarding flowchart 400.

Flowchart 400 begins with step 402. In step 402, an alert association graph is generated, where the alert association graph indicates the alerts as nodes and the association scores as edges between corresponding pairs of alerts. For example, with reference to FIG. 2, alert association determiner 202 may generate alert association graph 208 indicating alerts 214 as nodes and the association scores as edges between corresponding pairs of alerts of alerts 214. In an embodiment, association scores can be determined by assigning pairs of alerts of alerts 214 a lift score, where the lift score indicates a ratio of the probability that pairs of alerts will happen together on an entity to the probability that pairs of alerts will happen separately on an entity, for example:

$$\text{lift score} = \frac{P(A \cap B)}{P(A) * P(B)}$$

where A and B represent different alerts generated with respect to an entity. The probabilities may be determined by analyzing alerts 214 that are generated with respect to a set of entities.

In step 404, the alert association graph is filtered by removing edges between corresponding pairs of alerts from the alert association graph that have co-occurrence scores below a first threshold. For example, with reference to FIG. 2, alert association determiner 202 may filter alert association graph 208 by removing edges from alert association graph 208 that have co-occurrence scores with a predetermined relationship with a threshold value, such as the score being below the threshold value. In an embodiment, alert association determiner 202 may calculate the number of instances that a pair of alerts connected by an edge in alert association graph 208 are seen co-occurring (i.e., occurring in a same entity within a same timeframe) in alerts 214. If below a threshold (e.g., 100 alert co-occurrences), for example, then the edge between the pair of alerts is removed. A pair of alerts with a co-occurrence score below the threshold occurring close in time in an entity may be merely coincidental. Removal of an edge from alert association graph 208 prevents an association between a pair of alerts, whose connection is merely coincidental, from being used in forming security incident model 210.

In an embodiment, alert association determiner 202 may further filter alert association graph 208 by uniting nodes in alert association graph 208 with edges between them that have co-occurrence scores above a threshold. For example, if an edge between two nodes representing a pair of alerts has an edge with a co-occurrence score above a threshold (e.g., 1000 observed co-occurrences of the alerts), the nodes may be combined in the graph to form a single node. It may be well established that pairs of alerts with a co-occurrence score above the threshold are associated and no further analysis is needed to determine if the pair of alerts belong to a security incident. These thresholds may be set by analyzing a history of alerts existing on a cloud service, such as alert logs generated by individual computing devices and/or servers connected to a cloud or environment 114 or through logs aggregating a history of alerts across multiple computing devices and/or servers connected to the cloud or environment 114.

In step 406, the alerts are clustered into the clusters based on the filtered alert association graph. For example, with reference to FIG. 2, community identifier 204 clusters alerts 214 into the clusters based on filtered alert association graph 208. To help further illustrate, community identifier 204 may extract a list of communities from alert association graph 208. In an embodiment, community identifier 204 may extract a list of sets of nodes, each node set intersecting within itself (its own nodes connected by edges) but not intersecting with others of the sets of nodes (unconnected with others of the node sets), such that each set is considered a community. To perform this clustering, community identifier 204 may use a community detection algorithm that is sensitive to edge weights (such as the Louvain method, etc.) or other clustering algorithm or technique.

Figure 5:
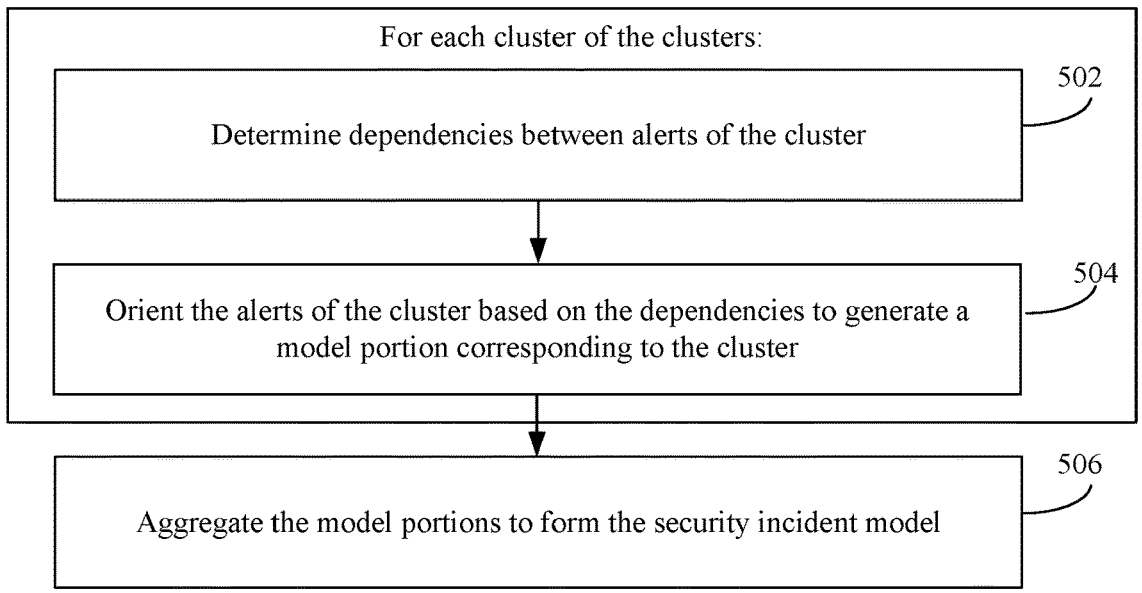
FIG. 5 shows a flowchart providing a process for forming a security incident model that defines sequences of alerts corresponding to security incidents, according to an example embodiment.

FIG. 5 will now be described to provide additional detail for generating security incident model 210. FIG. 5 shows a flowchart 500 for forming a security incident model that defines sequences of alerts corresponding to security incidents, according to an example embodiment. In an embodiment, steps of flowchart 500 may be implemented by security incident model generator 206 of FIG. 2. Other structural and operational embodiments will be apparent to persons skilled in the relevant art(s) based on the following discussion regarding flowchart 500.

Flowchart 500 begins with step 502. In step 502, for each cluster of the clusters, dependencies are determined between alerts of the cluster. For example, with reference to FIG. 2, security incident model generator 206 determines dependencies between alerts of a cluster for each cluster indicated in list of clusters 216 received from community identifier 204. In an embodiment, security incident model generator 206 may determine dependencies between alerts of a cluster using conditional probabilities and generate a skeleton of a graph (e.g., a directed acyclic graph (DAG)) based on the conditional probabilities, where nodes indicate the alerts of the cluster, edges between nodes indicate conditional dependencies (i.e., a pair of alerts that are directly connected and their connection cannot be explained through any other alerts in the graph), and nodes that are not connected represent alerts that are conditionally independent (i.e., pair of alerts are not directly connected) from each other. The graph may fulfill the conditional independence property. This may be accomplished using a casual discovery algorithm (e.g., PC algorithm).

In step 504, for each cluster of the clusters, the alerts of the cluster are oriented based on the dependencies to generate a model portion corresponding to the cluster. For example, with reference to FIG. 2, security incident model generator 206 orients alerts of a cluster based on the dependencies to generate a model portion corresponding to the cluster for each cluster indicated in list of clusters 216.

Continuing with the example discussed in step 502 of FIG. 5, security incident model generator 206 may orient the edges of the graph generated in step 502 based on kill-chain position information. For example, if kill-chain position information is available, then edges in the graph are oriented according to kill-chain precedence. Additionally, the edges of the graph generated in step 502 may be oriented based on temporal relation information between alerts. For example, if there is a strict temporal relation between alerts (i.e., alert A is always seen coming before alert B and the time difference between the alerts is shorter than random), then the edges of the graph are oriented accordingly (i.e., alert A→alert B). Further, the edges of the graph generated in step 502 may be oriented based on a collider. For example, considering a group of alerts connected as such: A-C-B, if alert A and alert B are independent, but conditionally dependent given alert C, then alert C is a collider and both alert A and alert B are related to alert C. In this case, the graph may be oriented in the following manner (with no path between alert A and alert B): A→C←B or A←C→B.

In step 506, the model portions are aggregated to form the security incident model. For example, with reference to FIG. 2, security incident model generator 206 may aggregate all the model portions generated for the clusters indicated on list of clusters 216 to form security incident model 210. After aggregation, any alerts connected in a path in security incident model 210 indicates a single security incident.

Figure 6:
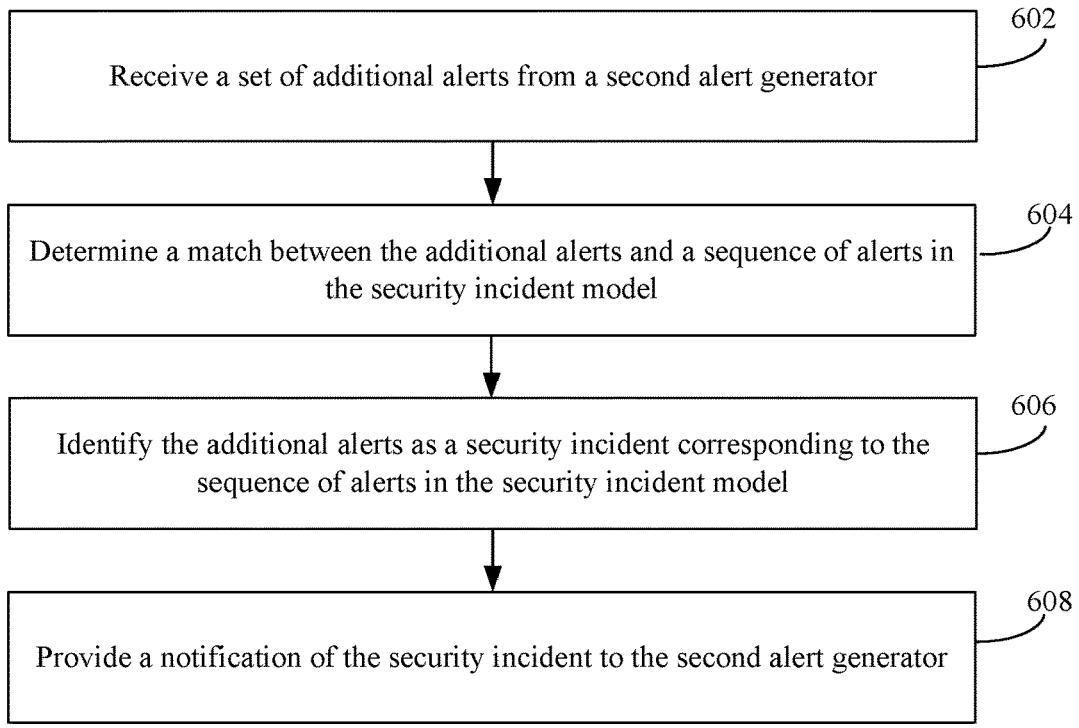
FIG. 6 shows a flowchart providing a process for identifying alerts as a security incident using a security incident model, according to an example embodiment.

For instance, FIG. 6 shows a flowchart 600 for identifying alerts as a security incident using a security incident model, according to an example embodiment. In an embodiment, steps of flowchart 600 may be implemented by alert incident identifier 212 of FIG. 2. Other structural and operational embodiments will be apparent to persons skilled in the relevant art(s) based on the following discussion regarding flowchart 600.

Flowchart 600 begins with step 602. In step 602, a set of additional alerts are received from a second alert generator. For example, with reference to FIG. 2, alert incident identifier 212 receives alerts 222 from a second alert generator (e.g., security management system 116 and/or resources 106A, 106B, 106C, 106D in FIG. 1).

In step 604, a match between the additional alerts and a sequence of alerts in the security incident model is determined. For example, with reference to FIG. 2, alert incident identifier 212 may determine a match between alerts 222 and a sequence of alerts of alerts 214 defined in security incident model 210. In an embodiment, alert incident identifier 212 applies alerts 222 to security incident model 210 and receives an indication 218 from security incident model 210 that alerts 222 or a portion of alerts 222 matches one or more sequence of alerts of alerts 214 defined in security incident model 210. For illustration purposes, security incident model 210 is shown to be deployed in security incident model generator 206 but may be deployed separately from security incident model generator 206, including being deployed in alert incident identifier 212.

In step 606, the additional alerts are identified as a security incident corresponding to the sequence of alerts in the security incident model. For example, with reference to FIG. 2, alert incident identifier 212 may identify alerts 222 as a security incident corresponding to the sequence of alerts of alerts 214 in security incident model 210. In an embodiment, based on the matching of alerts 222 or a portion of alerts 222 to one or more sequence of alerts of alerts 214, alert incident identifier 212 may identify alerts 222 or a portion of alerts 222 as being related to security incidents corresponding to one or more sequence of alerts of alerts 214 defined in security incident model 210.

In step 608, a notification of the security incident is provided to the second alert generator. For example, with reference to FIG. 2, alert incident identifier 212 may provide notification 220 of the security incident to the second alert generator (e.g., security management system 116 and/or resources 106A, 106B, 106C, 106D in FIG. 1) and/or a system administrator.

Figure 7:
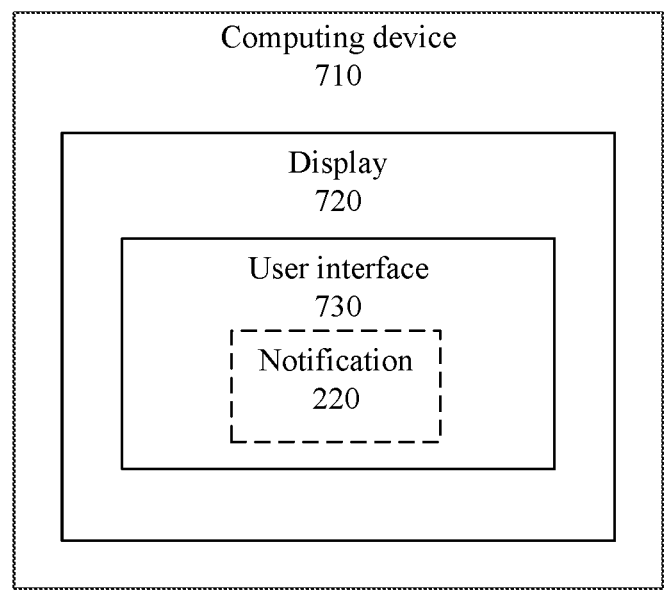
FIG. 7 shows an exemplary user interface for providing a notification of a security incident to a system administrator or other user, according to an example embodiment.

Step 608 is described in further detail with reference to FIG. 7. For instance, FIG. 7 shows computing device 710, which may be used by a system administrator in charge of managing and/or monitoring the security of any of resources in 106A, 106B, 106C, and 106D in environment 114 in FIG. 1. In this example, computing device 710 may contain a display 720, which may be any suitable display, such as a liquid crystal display, cathode ray tube display, light-emitting diode display, or any other type of display connectable to computing device 710. Display 720 may be external to or incorporated in computing device 710. Display 720 may contain a user interface 730 (e.g., a graphical user interface) that displays, among other things, information to a system administrator regarding the security of any of resources in 106A, 106B, 106C, and 106D in environment 114. In an embodiment, notification 220 may be displayed on user interface 730 of computing device 710. Computing device 710 may also include other peripheral output devices (not shown) such as speakers and printers. In another embodiment, incident indication may be transmitted to any such peripheral device attached to computing device 710.

Notification 220 alerts of security incident identified using security incident model 210 of FIG. 2 may be displayed to a user of computing device 710. Notification 220 may also include information helpful to the user of computing device 710 in investigating an attack. For example, notification 220 indicating such information, such as identifying a resource that was attacked, a description of attack, a level of seriousness of attack, a time of detection, any action taken to address an attack, remediation steps, etc., may be displayed to the user of computing device 710.

III. Example Computer System Implementation

Security incident inference system 102, security management system 116, alert association determiner 202, community identifier 204, security incident model generator 206, alert incident identifier 212, flowchart 300, flowchart 400, flowchart 500, and/or flowchart 600 may be implemented in hardware, or hardware combined with one or both of software and/or firmware. For example, security incident inference system 102, security management system 116, alert association determiner 202, community identifier 204, security incident model generator 206, alert incident identifier 212, flowchart 300, flowchart 400, flowchart 500, and/or flowchart 600 may be implemented as computer program code/instructions configured to be executed in one or more processors and stored in a computer readable storage medium. In another embodiment, security incident inference system 102, security management system 116, alert association determiner 202, community identifier 204, security incident model generator 206, alert incident identifier 212, flowchart 300, flowchart 400, flowchart 500, and/or flowchart 600 may also be implemented in hardware that operates software as a service (SaaS) or platform as a service (PaaS). Alternatively, security incident inference system 102, security management system 116, alert association determiner 202, community identifier 204, security incident model generator 206, alert incident identifier 212, flowchart 300, flowchart 400, flowchart 500, and/or flowchart 600 may be implemented as hardware logic/electrical circuitry.

For instance, in an embodiment, one or more, in any combination, of security incident inference system 102, security management system 116, alert association determiner 202, community identifier 204, security incident model generator 206, alert incident identifier 212, flowchart 300, flowchart 400, flowchart 500, and/or flowchart 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
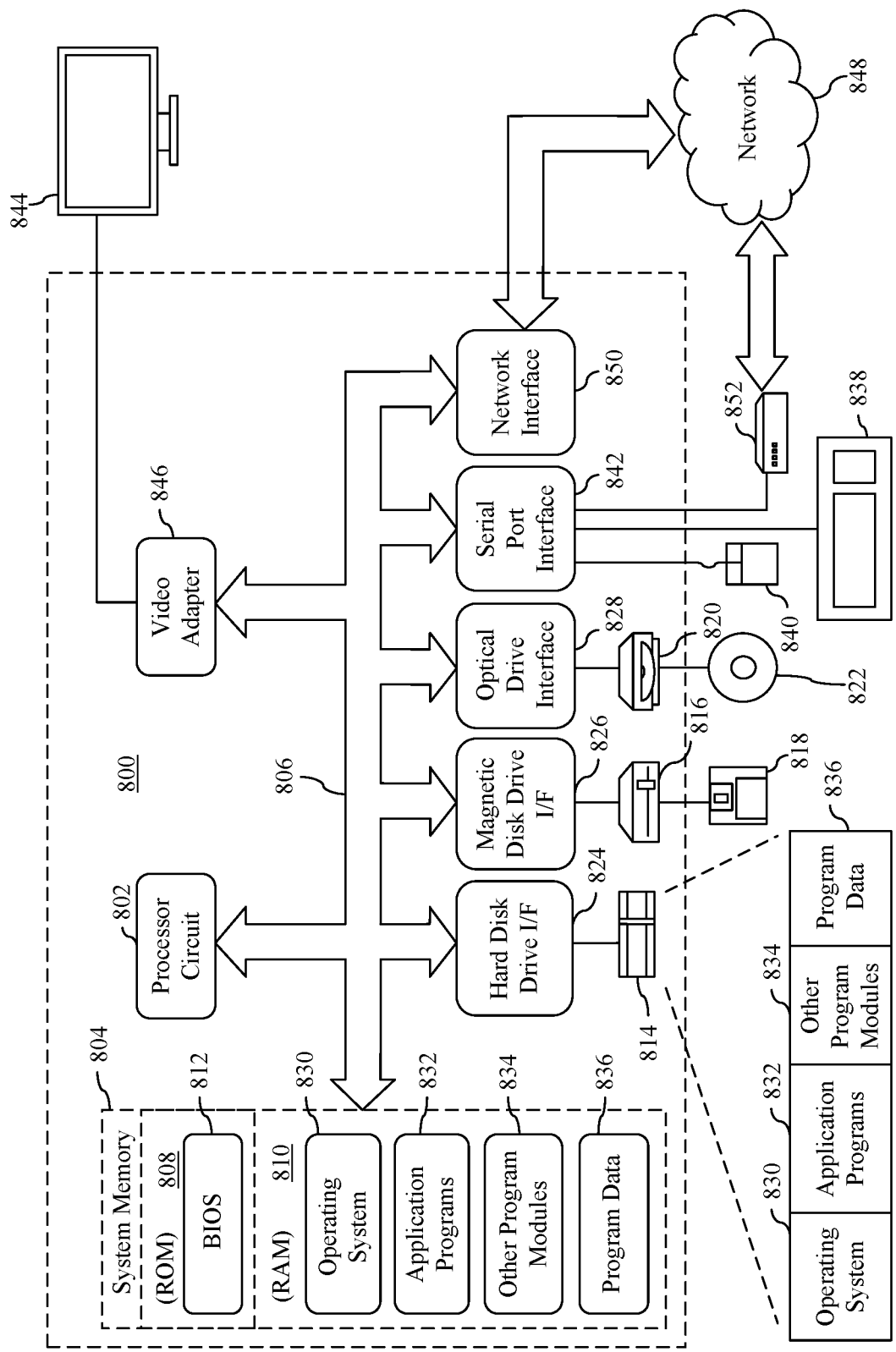
FIG. 8 is a block diagram of an example processor-based computer system that may be used to implement various embodiments.

FIG. 8 depicts an exemplary implementation of a computing device 800 in which embodiments may be implemented. For example, components of system 100 and system 200 may each be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing security incident inference system 102, security management system 116, alert association determiner 202, community identifier 204, security incident model generator 206, alert incident identifier 212, flowchart 300, flowchart 400, flowchart 500, and/or flowchart 600 (including any suitable step of flowcharts 200, 400, 500, and 600), and/or further embodiments described herein.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers. Display screen 844, and/or any other peripheral output devices (not shown) may be used for implementing user interface 730, and/or any further embodiments described herein.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In a first embodiment, a computing device, comprises: one or more processors; and one or more memory devices that store executable computer program logic for execution by the one or more processors, the executable computer program logic comprising: an alert association determiner configured to receive alerts generated with respect to a set of entities by a first alert generator, and calculate association scores for pairs of the alerts; a community identifier configured to cluster the alerts into clusters based on the association scores; and a security incident model generator configured to form a security incident model, based on the clusters, that defines sequences of alerts corresponding to security incidents.

In an embodiment of the foregoing computing device, the alert association determiner is configured to: generate an alert association graph indicating the alerts as nodes and the association scores as edges between corresponding pairs of alerts; and filter the alert association graph by removing edges between corresponding pairs of alerts from the alert association graph having co-occurrence scores below a first threshold; and wherein the community identifier is configured to cluster the alerts into the clusters based on the filtered alert association graph.

In an embodiment of the foregoing computing device, the alert association determiner, to filter the alert association graph, is further configured to: unite first and second nodes in the alert association graph if an edge between the first and second nodes has a co-occurrence score above a second threshold.

In an embodiment of the foregoing computing device, the security incident model generator is configured to, for each cluster of the clusters, determine dependencies between alerts of the cluster, and orient the alerts of the cluster based on the dependencies to generate a model portion corresponding to the cluster; and wherein the security incident model generator is further configured to aggregate the model portions to form the security incident model.

In an embodiment of the foregoing computing device, the security incident model generator is configured to: determine the dependency between alerts of a cluster based on a conditional independence property.

In an embodiment of the foregoing computing device, the security incident model generator, to orient the alerts of the cluster, is configured to: orient the alerts of the cluster based on at least one of kill-chain position information, temporal relation information between alerts, or a collider.

In an embodiment of the foregoing computing device, an alert incident identifier is configured to: receive a set of additional alerts from a second alert generator; determine a match between the additional alerts and a sequence of alerts in the security incident model; identify the additional alerts as a security incident corresponding to the sequence of alerts in the security incident model; and provide a notification of the security incident to the second alert generator.

In another embodiment, a method, comprises: receiving alerts generated with respect to a set of entities by a first alert generator; calculating association scores for pairs of the alerts; clustering the alerts into clusters based on the association scores; and forming a security incident model, based on the clusters, that defines sequences of alerts corresponding to security incidents.

In an embodiment of the foregoing method, the method comprises: generating an alert association graph indicating the alerts as nodes and the association scores as edges between corresponding pairs alerts; filtering the alert association graph by removing edges between corresponding pairs of alerts from the alert association graph having co-occurrence scores below a first threshold; and clustering the alerts into the clusters based on the filtered alert association graph.

In an embodiment of the foregoing method, the method further comprises: uniting first and second nodes in the alert association graph if an edge between the first and second nodes has a co-occurrence score above a second threshold.

In an embodiment of the foregoing method, the method further comprises: for each cluster of the clusters, determining dependencies between alerts of the cluster, and orienting the alerts of the cluster based on the dependencies to generate a model portion corresponding to the cluster; and aggregating the model portions to form the security incident model.

In an embodiment of the foregoing method, the method further comprises: determining the dependency between alerts of a cluster based on a conditional independence property.

In an embodiment of the foregoing method, the method further comprises: orienting the alerts of the cluster comprises orienting the alerts of the cluster based on at least one of kill-chain position information, temporal relation information between alerts, or a collider.

In an embodiment of the foregoing method, the method further comprises: receiving a set of additional alerts from a second alert generator; determining a match between the additional alerts and a sequence of alerts in the security incident model; identifying the additional alerts as a security incident corresponding to the sequence of alerts in the security incident model; and providing a notification of the security incident to the second alert generator.

In another embodiment, a computer-readable storage medium having program instructions recorded thereon that, when executed by at least one processing circuit of a computing device, perform a method, comprises: receiving alerts generated with respect to a set of entities by a first alert generator; calculating association scores for pairs of the alerts; clustering the alerts into clusters based on the association scores; and forming a security incident model, based on the clusters, that defines sequences of alerts corresponding to security incidents.

In an embodiment of the foregoing computer-readable storage medium, the method further comprises: generating an alert association graph indicating the alerts as nodes and the association scores as edges between corresponding pairs alerts; filtering the alert association graph by removing edges between corresponding pairs of alerts from the alert association graph having co-occurrence scores below a first threshold; and clustering the alerts into the clusters based on the filtered alert association graph.

In an embodiment of the foregoing computer-readable storage medium, the method further comprises: for each cluster of the clusters, determining dependencies between alerts of the cluster, and orienting the alerts of the cluster based on the dependencies to generate a model portion corresponding to the cluster; and aggregating the model portions to form the security incident model.

In an embodiment of the foregoing computer-readable storage medium, the method further comprises: determining the dependency between alerts of a cluster based on a conditional independence property.

In an embodiment of the foregoing computer-readable storage medium, the method further comprises: orienting the alerts of the cluster comprises orienting the alerts of the cluster based on at least one of kill-chain position information, temporal relation information between alerts, or a collider.

In an embodiment of the foregoing computer-readable storage medium, the method further comprises: receiving a set of additional alerts from a second alert generator; determining a match between the additional alerts and a sequence of alerts in the security incident model; identifying the additional alerts as a security incident corresponding to the sequence of alerts in the security incident model; and providing a notification of the security incident to the second alert generator.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A computing device, comprising:
   one or more processors; and
   one or more memory devices that store executable computer program logic for execution by the one or more processors, the executable computer program logic comprising:
      an alert association determiner configured to:
         receive alerts generated with respect to a set of entities by a first alert generator, and
         calculate association scores for pairs of the alerts, each association score indicating a strength of association between a pair of alerts;
      a community identifier configured to cluster the alerts into clusters based on the association scores; and
      a security incident model generator configured to form a security incident model, based on the clusters, that defines sequences of alerts corresponding to security incidents.

2. The computing device of claim 1, wherein the alert association determiner is configured to:
   generate an alert association graph indicating the alerts as nodes and the association scores as edges between corresponding pairs of alerts; and
   filter the alert association graph by removing edges between corresponding pairs of alerts from the alert association graph having co-occurrence scores below a first threshold; and
   wherein the community identifier is configured to cluster the alerts into the clusters based on the filtered alert association graph.

3. The computing device of claim 2, wherein the alert association determiner, to filter the alert association graph, is further configured to:
   unite first and second nodes in the alert association graph if an edge between the first and second nodes has a co-occurrence score above a second threshold.

4. The computing device of claim 1, wherein the security incident model generator is configured to, for each cluster of the clusters,
   determine dependencies between alerts of the cluster, and
   orient the alerts of the cluster based on the dependencies to generate a model portion corresponding to the cluster; and
   wherein the security incident model generator is further configured to aggregate the model portions to form the security incident model.

5. The computing device of claim 4, wherein the security incident model generator is configured to:
   determine the dependency between alerts of a cluster based on a conditional independence property.

6. The computing device of claim 4, wherein the security incident model generator, to orient the alerts of the cluster, is configured to:
   orient the alerts of the cluster based on at least one of
      kill-chain position information,
      temporal relation information between alerts, or
      a collider.

7. The computing device of claim 1, further comprising an alert incident identifier configured to:
   receive a set of additional alerts from a second alert generator;
   determine a match between the additional alerts and a sequence of alerts in the security incident model;
   identify the additional alerts as a security incident corresponding to the sequence of alerts in the security incident model; and
   provide a notification of the security incident to the second alert generator.

8. A method, comprising:
   receiving alerts generated with respect to a set of entities by a first alert generator;
   calculating association scores for pairs of the alerts, each association score indicating a strength of association between a pair of alerts;
   clustering the alerts into clusters based on the association scores; and
   forming a security incident model, based on the clusters, that defines sequences of alerts corresponding to security incidents.

9. The method of claim 8, further comprising:
   generating an alert association graph indicating the alerts as nodes and the association scores as edges between corresponding pairs alerts;
   filtering the alert association graph by removing edges between corresponding pairs of alerts from the alert association graph having co-occurrence scores below a first threshold; and
   clustering the alerts into the clusters based on the filtered alert association graph.

10. The method of claim 9, further comprising:
   uniting first and second nodes in the alert association graph if an edge between the first and second nodes has a co-occurrence score above a second threshold.

11. The method of claim 8, further comprising:
   for each cluster of the clusters,
      determining dependencies between alerts of the cluster, and
      orienting the alerts of the cluster based on the dependencies to generate a model portion corresponding to the cluster; and aggregating the model portions to form the security incident model.

12. The method of claim 11, further comprising:
determining the dependency between alerts of a cluster based on a conditional independence property.

13. The method of claim 11, wherein orienting the alerts of the cluster comprises orienting the alerts of the cluster based on at least one of kill-chain position information, temporal relation information between alerts, or a collider.

14. The method of claim 8, further comprising:
receiving a set of additional alerts from a second alert generator;
determining a match between the additional alerts and a sequence of alerts in the security incident model;
identifying the additional alerts as a security incident corresponding to the sequence of alerts in the security incident model; and
providing a notification of the security incident to the second alert generator.

15. A computer-readable storage medium having program instructions recorded thereon that, when executed by at least one processing circuit of a computing device, perform a method, comprising:
receiving alerts generated with respect to a set of entities by a first alert generator;
calculating association scores for pairs of the alerts, each association score indicating a strength of association between a pair of alerts;
clustering the alerts into clusters based on the association scores; and
forming a security incident model, based on the clusters, that defines sequences of alerts corresponding to security incidents.

16. The computer-readable storage medium of claim 15, wherein the method further comprises:
generating an alert association graph indicating the alerts as nodes and the association scores as edges between corresponding pairs alerts;
filtering the alert association graph by removing edges between corresponding pairs of alerts from the alert association graph having co-occurrence scores below a first threshold; and
clustering the alerts into the clusters based on the filtered alert association graph.

17. The computer-readable storage medium of claim 15, further comprising:
for each cluster of the clusters,
determining dependencies between alerts of the cluster, and
orienting the alerts of the cluster based on the dependencies to generate a model portion corresponding to the cluster; and
aggregating the model portions to form the security incident model.

18. The computer-readable storage medium of claim 17, further comprising:
determining the dependency between alerts of a cluster based on a conditional independence property.

19. The computer-readable storage medium of claim 17, wherein orienting the alerts of the cluster comprises orienting the alerts of the cluster based on at least one of kill-chain position information, temporal relation information between alerts, or a collider.

20. The computer-readable storage medium of claim 15, further comprising:
receiving a set of additional alerts from a second alert generator;
determining a match between the additional alerts and a sequence of alerts in the security incident model;
identifying the additional alerts as a security incident corresponding to the sequence of alerts in the security incident model; and
providing a notification of the security incident to the second alert generator.

* * * * *